United States Patent
Lynam et al.

(10) Patent No.: US 12,384,304 B2
(45) Date of Patent: Aug. 12, 2025

(54) VEHICULAR CAMERA MONITORING SYSTEM

(71) Applicant: Magna Electronics Inc., Auburn Hills, MI (US)

(72) Inventors: Niall R. Lynam, Holland, MI (US); Yuesheng Lu, Farmington Hills, MI (US)

(73) Assignee: Magna Electronics Inc., Holland, MI (US)

( * ) Notice: Subject to any disclaimer, the term of this patent is extended or adjusted under 35 U.S.C. 154(b) by 0 days.

(21) Appl. No.: 18/653,187

(22) Filed: May 2, 2024

(65) Prior Publication Data

US 2024/0278736 A1    Aug. 22, 2024

Related U.S. Application Data

(63) Continuation of application No. 18/054,963, filed on Nov. 14, 2022, now Pat. No. 11,975,659, which is a
(Continued)

(51) Int. Cl.
*B60W 50/14*    (2020.01)
*B60K 35/22*    (2024.01)
(Continued)

(52) U.S. Cl.
CPC ............. *B60R 11/04* (2013.01); *B60K 35/22* (2024.01); *B60K 35/60* (2024.01); *B60R 1/26* (2022.01); *B60R 1/28* (2022.01); *B62D 15/028* (2013.01); *G08G 1/168* (2013.01); *B60K 35/10* (2024.01); *B60K 35/28* (2024.01);
(Continued)

(58) Field of Classification Search
CPC . B60R 11/04; B60R 2001/1253; B60K 35/00; B60K 2370/165; B60K 2370/1526; B62D 15/028; G08G 1/168
See application file for complete search history.

(56) References Cited

U.S. PATENT DOCUMENTS

| 2,263,382 A | 11/1941 | Gotzinger |
| 2,580,014 A | 12/1951 | Gazda |

(Continued)

FOREIGN PATENT DOCUMENTS

WO    WO-2017191558 A1 * 11/2017    ............ B60R 1/04

*Primary Examiner* — Patrick E Demosky
(74) *Attorney, Agent, or Firm* — HONIGMAN LLP

(57) ABSTRACT

A vehicular camera monitoring system includes a rearward-viewing camera, a driver-side camera, a passenger-side camera and a dual-mode interior rearview mirror assembly disposed at an interior cabin of a vehicle. The dual-mode interior rearview mirror assembly is operable in a mirror mode and a display mode. With the vehicle traveling along a road, and with the dual-mode interior rearview mirror assembly operating in the display mode, a video display screen displays video images derived at least in part from image data captured by the rearward-viewing camera, the driver-side camera and/or the passenger-side camera. The video display screen displays at least passenger-side video images of a passenger-side region sideward and rearward of the passenger side of the vehicle until a period of time elapses following a passenger exiting the vehicle from a passenger seat of the vehicle.

31 Claims, 5 Drawing Sheets

Related U.S. Application Data continuation of application No. 16/949,976, filed on Nov. 23, 2020, now Pat. No. 11,498,494.

(60) Provisional application No. 62/942,351, filed on Dec. 2, 2019, provisional application No. 62/941,089, filed on Nov. 27, 2019.

(51) Int. Cl.
  *B60K 35/60* (2024.01)
  *B60R 1/26* (2022.01)
  *B60R 1/28* (2022.01)
  *B60R 11/04* (2006.01)
  *B62D 15/02* (2006.01)
  *G08G 1/16* (2006.01)
  *B60K 35/10* (2024.01)
  *B60K 35/28* (2024.01)
  *B60R 1/12* (2006.01)
  *B60R 1/30* (2022.01)

(52) U.S. Cl.
  CPC  *B60K 2360/1526* (2024.01); *B60K 2360/165* (2024.01); *B60R 2001/1253* (2013.01); *B60R 1/30* (2022.01)

(56) References Cited

U.S. PATENT DOCUMENTS

| | | | |
|---|---|---|---|
| 3,266,016 A | 8/1966 | Maru | |
| 4,499,451 A | 2/1985 | Suzuki et al. | |
| 4,588,267 A | 5/1986 | Pastore | |
| 4,623,222 A | 11/1986 | Itoh et al. | |
| 4,630,904 A | 12/1986 | Pastore | |
| 4,721,364 A | 1/1988 | Itoh et al. | |
| 4,906,085 A | 3/1990 | Sugihara et al. | |
| 5,313,335 A | 5/1994 | Gray et al. | |
| 5,355,284 A | 10/1994 | Roberts | |
| 5,436,741 A | 7/1995 | Crandall | |
| 5,481,409 A | 1/1996 | Roberts | |
| 5,575,552 A | 11/1996 | Faloon et al. | |
| 5,587,699 A | 12/1996 | Faloon et al. | |
| 5,668,663 A | 9/1997 | Varaprasad et al. | |
| 5,786,772 A | 7/1998 | Schofield et al. | |
| 5,788,357 A | 8/1998 | Muth et al. | |
| 5,938,320 A | 8/1999 | Crandall | |
| 6,005,724 A | 12/1999 | Todd | |
| 6,045,243 A | 4/2000 | Muth et al. | |
| 6,111,683 A | 8/2000 | Cammenga et al. | |
| 6,257,746 B1 | 7/2001 | Todd et al. | |
| 6,264,353 B1 | 7/2001 | Caraher et al. | |
| 6,356,376 B1 | 3/2002 | Tonar et al. | |
| 6,512,624 B2 | 1/2003 | Tonar et al. | |
| 6,700,692 B2 | 3/2004 | Tonar et al. | |
| 6,882,287 B2 | 4/2005 | Schofield | |
| 7,581,859 B2 | 9/2009 | Lynam | |
| 7,777,611 B2 | 8/2010 | Desai | |
| 8,874,317 B2 | 10/2014 | Marczok et al. | |
| 9,126,525 B2 | 9/2015 | Lynam et al. | |
| 9,180,908 B2 | 11/2015 | Van Dan Elzen et al. | |
| 9,340,227 B2 | 5/2016 | Bajpai | |
| 9,405,120 B2 | 8/2016 | Graf et al. | |
| 9,946,940 B2 | 4/2018 | Gupta et al. | |
| 10,029,614 B2 | 7/2018 | Larson | |
| 10,046,706 B2 | 8/2018 | Larson et al. | |
| 10,078,789 B2 | 9/2018 | Gupta et al. | |
| 10,086,870 B2 | 10/2018 | Gieseke et al. | |
| 10,166,924 B2 | 1/2019 | Baur | |
| 10,214,206 B2 | 2/2019 | Latotzki | |
| 10,222,224 B2 | 3/2019 | Johnson et al. | |
| 10,268,904 B2 | 4/2019 | Gupta | |
| 10,300,856 B2 | 5/2019 | Baur et al. | |
| 10,315,651 B2 | 6/2019 | Fiaschetti et al. | |
| 10,421,404 B2 | 9/2019 | Larson et al. | |
| 10,442,360 B2 | 10/2019 | LaCross et al. | |
| 10,583,779 B2 | 3/2020 | Koravadi | |
| 11,498,494 B2 | 11/2022 | Lynam et al. | |
| 11,975,659 B2 | 5/2024 | Lynam et al. | |
| 2003/0236622 A1* | 12/2003 | Schofield | G01C 21/1654 340/995.28 |
| 2011/0181728 A1* | 7/2011 | Tieman | B60R 1/28 348/148 |
| 2012/0013742 A1* | 1/2012 | Fairchild | G06V 10/22 348/148 |
| 2014/0226008 A1* | 8/2014 | Lang | B60R 1/25 348/148 |
| 2014/0285666 A1 | 9/2014 | O'Connell et al. | |
| 2014/0336876 A1 | 11/2014 | Gieseke et al. | |
| 2015/0009010 A1 | 1/2015 | Biemer | |
| 2015/0015710 A1 | 1/2015 | Tiryaki | |
| 2015/0022664 A1 | 1/2015 | Pflug et al. | |
| 2015/0092042 A1 | 4/2015 | Fursich | |
| 2015/0232030 A1 | 8/2015 | Bongwald | |
| 2015/0294169 A1 | 10/2015 | Zhou et al. | |
| 2015/0296135 A1 | 10/2015 | Wacquant et al. | |
| 2015/0352953 A1 | 12/2015 | Koravadi | |
| 2016/0137126 A1 | 5/2016 | Fursich et al. | |
| 2016/0209647 A1 | 7/2016 | Fursich | |
| 2017/0232890 A1* | 8/2017 | Lewis | G01C 21/26 348/148 |
| 2017/0274906 A1 | 9/2017 | Hassan et al. | |
| 2017/0329346 A1 | 11/2017 | Latotzki | |
| 2017/0355312 A1 | 12/2017 | Habibi et al. | |
| 2018/0093613 A1* | 4/2018 | Timoneda | H04N 7/181 |
| 2018/0134217 A1 | 5/2018 | Peterson et al. | |
| 2018/0312114 A1 | 11/2018 | Inoue | |
| 2019/0118717 A1 | 4/2019 | Blank et al. | |
| 2019/0146297 A1 | 5/2019 | Lynam et al. | |
| 2019/0258131 A9 | 8/2019 | Lynam et al. | |
| 2019/0344828 A1 | 11/2019 | Omori et al. | |
| 2020/0130676 A1 | 4/2020 | Smid | |
| 2021/0155167 A1 | 5/2021 | Lynam et al. | |
| 2021/0162926 A1 | 6/2021 | Lu | |

* cited by examiner

FIG. 7A Single Camera

FIG. 7B Three Cameras

FIG. 7C Three Cameras Stitched

- ❏ Display Size: at least 7"
- ❏ Display Technology: Amorphous
- ❏ Display Type: TFT LCD or OLED
- ❏ Display Active Area: 152.64 (H) x 91.58 (V)
- ❏ Display Interface: LVDS
- ❏ Display Aspect Ratio: 15:9
- ❏ Display Resolution: at least 1280 RGB (H) x 768(V)
- ❏ Display Pixels Per Inch: at least 213 ppi
- ❏ Display Backlight: at least 1000 cd/m$^2$
- ❏ Display Color Gamut: 60% NTSC
- ❏ Digital Video Input: 60 FPS
- ❏ Auto Calibration: To the Horizon
- ❏ Image Stabilization: 6 Axis Gyro/Accelerometer

FIG. 8

VEHICULAR CAMERA MONITORING SYSTEM

CROSS REFERENCE TO RELATED APPLICATIONS

The present application is a continuation of U.S. patent application Ser. No. 18/054,963, filed Nov. 14, 2022, now U.S. Pat. No. 11,975,659, which is a continuation of U.S. patent application Ser. No. 16/949,976, filed Nov. 23, 2020, now U.S. Pat. No. 11,498,494, which claims the filing benefits of U.S. provisional application Ser. No. 62/942,351, filed Dec. 2, 2019, and U.S. provisional application Ser. No. 62/941,089, filed Nov. 27, 2019, which are hereby incorporated herein by reference in their entireties.

FIELD OF THE INVENTION

The present invention relates to vehicular vision systems that display video images derived from image data captured by one or more cameras of the vehicle.

BACKGROUND OF THE INVENTION

It is known to provide a video display at the exterior rearview mirror assembly, such as described in U.S. Pat. No. 7,777,611, which is hereby incorporated herein by reference in its entirety, or to provide a video display at an interior rearview mirror assembly to display sideward and/or rearward images, such as described in U.S. Pat. No. 5,670,935, which is hereby incorporated herein by reference in its entirety. A variety of interior and exterior mirror assemblies with indicators are known in the art, such as U.S. Pat. Nos. 5,668,663; 5,355,284; 5,788,357; 6,257,746; 6,005,724; 5,481,409; 6,111,683; 6,045,243; 6,264,353; 6,512,624; 6,356,376; 2,263,382; 2,580,014; 3,266,016; 4,499,451; 4,588,267; 4,630,904; 4,623,222; 4,721,364; 4,906,085; 5,313,335; 5,587,699; 5,575,552; 5,436,741; 5,587,699; 5,938,320; 6,700,692 and 5,786,772, which are all hereby incorporated herein by reference in their entireties.

SUMMARY OF THE INVENTION

The present invention provides a camera monitoring system that has a driver-side video display screen that displays video images derived from image data captured by a driver-side camera and a passenger-side video display screen that displays video images derived from image data captured by a passenger-side camera. During normal forward driving of the vehicle along a road, the displayed video images (derived from image data captured by the driver-side and passenger-side cameras) allow the driver to see vehicles approaching and/or overtaking the equipped vehicle in the respective side traffic lanes adjacent to the traffic lane of the road along which the equipped vehicle is traveling. During a parking maneuver or a parking-space exit maneuver of the vehicle, the driver-side video display screen displays parking assist video images derived from image data captured by the driver-side camera and the passenger-side video display screen displays parking assist video images derived from image data captured by the passenger-side camera. The parking assist images may comprise video images of the ground adjacent to and forward and/or rearward of the vehicle to assist the driver in maneuvering the vehicle into or out from a parking space. Upon completion of the parking-space exit maneuver when the vehicle has fully exited a parking space and commences normal forward driving along the road, the driver-side video display screen automatically reverts to display of forward-driving driving assist video images derived from image data captured by the driver-side camera, and the passenger-side video display screen automatically reverts to display of forward-driving driving assist video images derived from image data captured by the passenger-side camera, with the displayed forward-driving driving assist video images (that are viewable by a driver of the equipped vehicle when normally driving the vehicle forward in traffic and when not parallel or perpendicular parking into a vacant parking space or when not exiting from a parking space) being different from the displayed parking assist video images (that are viewable by the driver of the equipped vehicle when parallel or perpendicular parking into a vacant parking space or when exiting from a parking space).

Differences between forward-driving driving assist video images and parking assist video images can include difference in the vertical field of view as seen on the display (preferably, the vertical field of view is larger when parking so that ground area adjacent to and along the side of the vehicle is viewable to the driver on the display screen). Differences between forward-driving driving assist video images and parking assist video images can include difference in the horizontal field of view as seen on the display (preferably, the horizontal field of view is narrower when parking so that the driver can focus viewing on obstacles or other vehicles close to the side of the equipped vehicle). Differences between forward-driving driving assist video images and parking assist video images can include zoomed images so the driver can better view what is close to and adjacent to the being parked vehicle. Differences between forward-driving driving assist video images and parking assist video images can include electronically generated graphic overlays, icons, indicia and/or the like, that overlay in real-time on the parking assist video images to allow the driver to gauge distance to, separation from and approach to obstacles, such as curbs, posts, walls and/or other vehicles, as the equipped vehicle is being parked. Preferably, such electronically generated graphic overlays are generated responsive to sensor data captured by the likes of ultrasonic or radar or lidar or camera sensors of the equipped vehicle (including image data sensor output from one or more of the driver-side camera, the passenger-side camera and the rear viewing camera) being provided to a data processor where such sensor data is processed to determine the likes of curbs, posts, walls and/or other vehicles, as the equipped vehicle is being parked.

These and other objects, advantages, purposes and features of the present invention will become apparent upon review of the following specification in conjunction with the drawings.

BRIEF DESCRIPTION OF THE DRAWINGS

FIGS. 7A-C are plan views of a dual-mode interior rearview mirror of the vehicle of FIG. 6 that displays video images derived from the rearward viewing camera (FIG. 7A) or all three cameras (FIGS. 7B and 7C); and FIG. 8 is a list of preferred display screen parameters and/or characteristics for the camera monitoring system.

DESCRIPTION OF THE PREFERRED EMBODIMENTS

Figure 1:
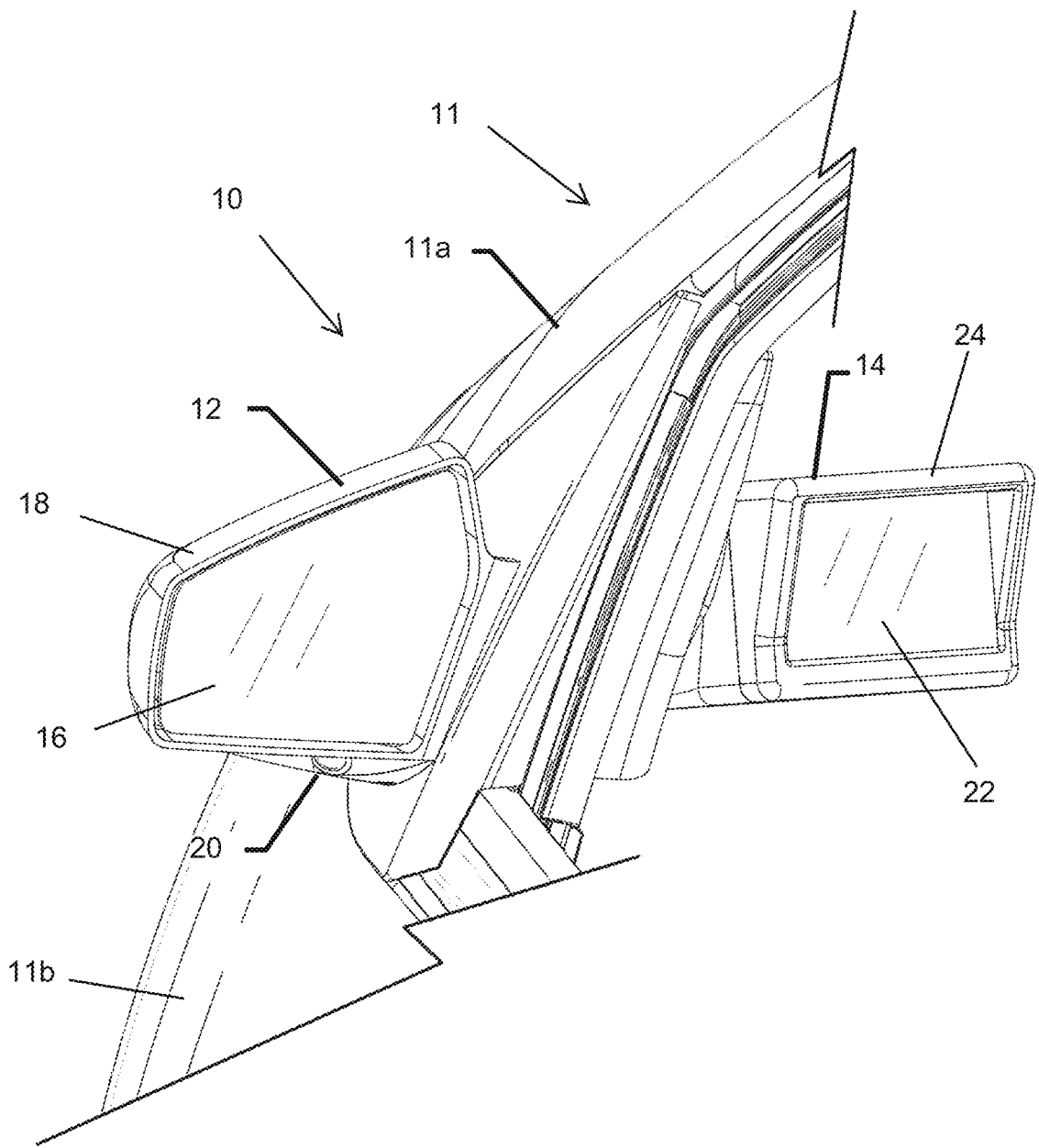
FIG. 1 is a perspective view of a driver-side camera an driver-side display screen in accordance with the present invention.
Figure 2:
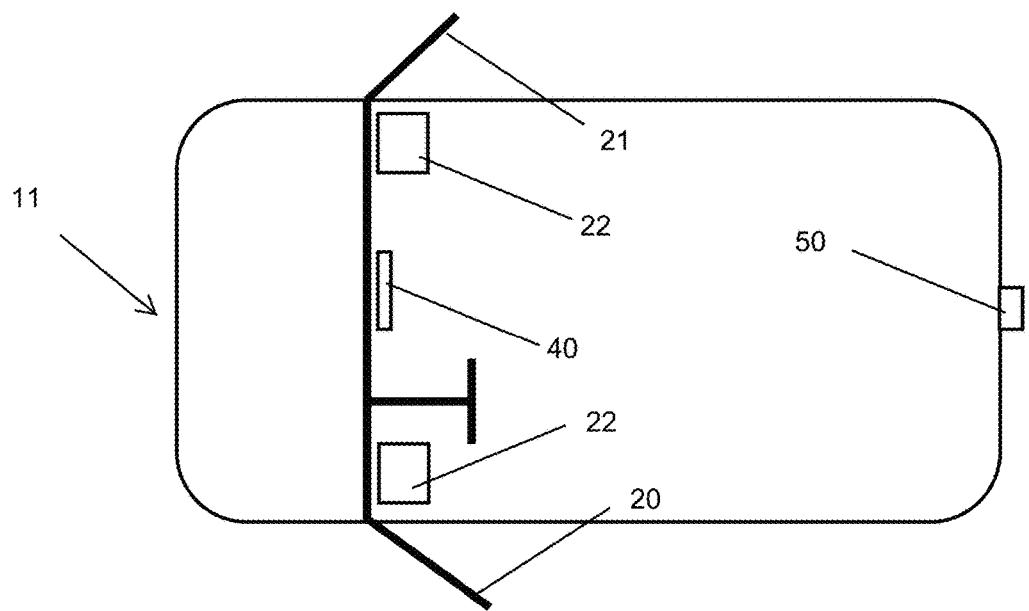
FIG. 2 is a plan view of a vehicle, showing the driver-side display and the passenger-side display in the vehicle.

Referring now to the drawings and the illustrative embodiments depicted therein, an exterior rearview mirror system 10 for a vehicle 11 includes an exterior rearview mirror assembly 12 and an in-cabin display device or module 14 disposed at or mounted at the interior of the vehicle door 11a or otherwise near to the exterior rearview mirror assembly 12 (FIG. 1). The exterior rearview mirror assembly 12 is mounted at the side 11b of the host or subject or equipped vehicle 11 and includes a mirror reflective element 16 and a mirror shell or casing 18, and a camera or imaging sensor 20 that is disposed at the mirror casing 18 and has a generally rearward and sideward field of view at the side of the equipped vehicle. An interior rearview mirror assembly 40 is mounted in the interior cabin of the equipped vehicle. Interior mirror assembly 40 may be attached at an in-cabin side of a windshield of the equipped vehicle. Preferably, interior mirror assembly 40 comprises a dual-mode interior rearview video mirror that can switch from a traditional reflection mode to a panoramic live-video display mode, such as is by utilizing aspects of the mirror assemblies and systems described in U.S. Pat. Nos. 10,442,360; 10,421,404; 10,166,924 and/or 10,046,706, and/or U.S. Publication Nos. US-2019-0146297; US-2019-0118717 and/or US-2017-0355312, which are all hereby incorporated herein by reference in their entireties. Dual-mode inter dual-mode interior rearview video mirror 40 receive video feed from either or both of side cameras 20, 21 and/or may receive video feed from rear-mounted camera 50.

Figure 4:
FIG. 4 is a perspective view of an exemplary camera and video display for a camera monitoring system.
Figure 5:
FIG. 5 is a perspective view of another exemplary camera and video display for a camera monitoring system.

In the illustrated embodiment, the driver-side exterior rearview mirror assembly 12 may comprise an FMVSS-111 compliant planar reflective element 16 that meets FMVSS-111 field of view requirements but does not substantially exceed them (for example, the reflective element may have a field of view of at least about 8 degrees from the side of the vehicle, but not more than about 12 degrees). The camera 20 may be disposed at any suitable location at mirror assembly 12, such as at an output portion of the mirror casing 18, such as shown in FIG. 1. Alternatively, and as can be seen in FIG. 4, the side camera can be behind the mirror reflective element and can view via a light transmitting aperture created (preferably via the likes of laser ablation) in the mirror reflector used for the reflective element (or the side camera can view via a transflective mirror reflector used for the reflective element). Presence of the camera can be masked by using a jail bar or dot pattern of the mirror reflector in front of where the camera is disposed. The display device or module may utilize aspects of the modules described in U.S. Publication Nos. US-2018-0134217 and/or US-2014-0285666, which are hereby incorporated herein by reference in their entireties.

The small or reduced size mirror reflective element provides a reduced size rearward field of view to the driver of the vehicle (as compared to larger size mirror reflective elements), and the smaller field of view may be supplemented or enhanced via the video display device 14 disposed at the interior of the vehicle cabin and in an area at or near the exterior rearview mirror assembly. For example, and as shown in FIG. 1, display device 14 may be disposed at an inboard portion of the vehicle door 11a and may be disposed immediately opposite exterior rearview mirror assembly 12. Optionally, the exterior rearview mirror assembly 12 and display device 14 may be incorporated into an imaging module that is mountable to or incorporated in a vehicle door, such that all of the wiring and communication links between the camera and display are provided within the module. The module may be mounted at or installed in the door assembly and may be electrically connected to a vehicle wiring harness via an electrical connector at the door, so that power and/or control of the module and/or system is provided via the vehicle wiring harness.

In the illustrated embodiment, the display device 14 includes a video display screen 22 supported at or housed by a housing or casing or structure 24 so that the display screen is at a location near the door that is readily viewable by a driver of the vehicle and is an area that the driver of the vehicle readily cognitively associates with where to look to see what is to the side and rear of the vehicle (because of the proximity of the display screen to the exterior rearview mirror assembly). When the mirror and display device are mounted at the vehicle door, the display screen and the exterior mirror move with the vehicle door when the vehicle door is opened and closed. Video display screen 22 may comprise any suitable video display screen, such as discussed below, and may comprise a touch screen to allow for user control of the video display and/or other vehicle functions via touching of appropriate locations at the display screen by the driver of the vehicle. For example, the video display screen may comprise directional arrow inputs to allow the user or driver to zoom in or out or to pan the video display up or down or to either side to set the rearward field of view at the display screen to a preferred setting for that individual. The system may include a memory system that also allows the user to set the rearward field of view to a desired setting and to store that setting such as in a similar manner as is done for memory mirror settings and/or memory seat settings and the like.

Camera monitoring systems (CMS) have been proposed as replacements for conventional rear-view mirrors. The advantages include reduced wind drag, reduced vehicle weight, and improved field of view. Despite these advantages, there are a number of reasons such systems are not yet in widespread use in vehicles. For example, reduced depth perception is a concern. Because a typical camera only provides monocular view, the ability to judge depth due to parallax is lost. Additionally, as a trade-off to gaining additional field of view on a given display size, the image may become distorted to the point where judgment of distance using relative object size is also hindered. Also, the video display displays an invariant field of view (i.e., the driver is unable to vary what he or she sees when viewing the video display, as can be done with an exterior mirror by moving the driver's head to a different position). The present invention provides the following concepts to help the driver visualize where other vehicles are relative to his or her own vehicle.

Parking a vehicle (whether perpendicular parking or the more challenging parallel parking) is an acquired skill. Drivers who are used to parking aided by sideview mirrors may need to relearn parking aided by CMS. Modern vehicles come replete with the likes of ultrasonic sensors and other obstacle sensors and thus CMS offers opportunity for overlays to be superimposed on the real-time video being displayed on the in-cabin CMS monitor. Such overlays can enhance the ease and efficacy of CMS-aided parking. Thus CMS may use overlays and different types of camera views shown on the in-cabin monitor during a parking maneuver.

Upon completion of parking (or upon exiting a parking space and entering traffic), the camera views seen by the driver automatically revert to what is suitable for normal driving either immediately or once a threshold condition is met (such as, for example, when the vehicle's speed reaches a threshold speed such as 10 miles per hour after exiting a parking space or when the vehicle has travelled a threshold distance such as 100 feet after exiting the parking space or when a time period such as 10 seconds has elapsed after the vehicle has exited the parking space).

Figure 3:
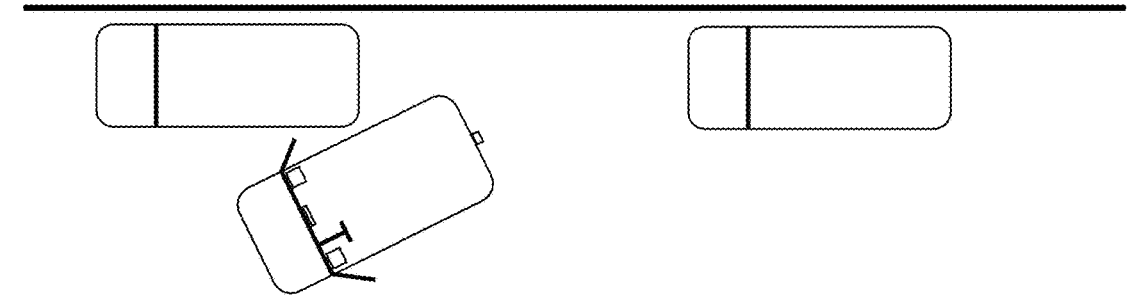
FIG. 3 is a plan view of the vehicle of FIG. 2, showing the vehicle during a parallel parking maneuver.

Also, when parallel parking (such as shown in FIG. 3), the camera view seen by the driver viewing the driver-side video monitor continues to enable the driver to see any cyclist or vehicle approaching the vehicle even while the camera view seen by the driver viewing the passenger-side video monitor may have changed during a later stage of the parallel parking maneuver (as the vehicle is maneuvered further into the parking space so as to be alongside the curb) to allow the driver see alignment of the vehicle with the curb.

Upon start-up and while maneuvering to exit a parking space, the camera view seen by the driver viewing the driver-side video monitor enables the driver to see any cyclist or vehicle approaching on the left side (or should the vehicle be parked with the driver-side camera curbside, the camera view seen by the driver viewing the passenger-side video monitor needs to enable the driver to see any cyclist or vehicle approaching on the right side). The system automatically displays parking assist video images at the parking-side video display screen (typically the passenger side) and automatically displays driving assist video images at the road-side video display screen (typically the driver side), such as responsive to the driver turning the ignition on after the vehicle is parked or responsive to the driver shifting the vehicle into forward gear (or reverse gear if the vehicle has to be backed up a little to achieve sufficient clearance from the vehicle parked ahead of the equipped vehicle for exiting the parking space).

Thus, as the vehicle drives along a road, the driver-side video monitor and the passenger-side video monitor display driving assist video images representative of the sideward and rearward or rearward-view portion of the field of view of the respective driver-side camera and passenger-side camera. When the driver of the vehicle wishes to park the vehicle along a side of the road (a parking-side of the road, typically the passenger side, but could be the driver side, such as on one-way streets), the driver of the vehicle may drive past a parking space between two spaced apart parked vehicles in which the driver intends to parallel park the vehicle. When the vehicle is positioned at least partially forward of the parking space, the driver shifts the vehicle into reverse gear to commence reversing of the vehicle into the parking space. Upon shifting into reverse gear and/or commencing the parking maneuver into the parking space (at the passenger side of the road), the driver-side video monitor continues display of the driving assist video images and the passenger-side video monitor automatically ceases display of the driving assist video images and displays parking assist video images that are different than the driving assist video images. The parking assist video images may be directed more downward (as compared to the driving assist video images) so as to include the ground region at the passenger side of the vehicle and at and around the parking space so that the driver can more readily see the ground and objects or curb at or in the parking space.

For situations where the parking space is at the passenger side of the vehicle (as shown in FIG. 3), the passenger-side video monitor may display downward viewing parking assist video images to show the driver the curb or objects in or adjacent to the target parking space, while the driver-side video monitor may display rearward viewing parking assist video images to show the driver any rearward approaching vehicles or bicycles or the like that may be approaching along the road. Thus, the driver-side video monitor may provide video images of other traffic or the like, while the passenger-side video monitor may provide video images of the curb or parking space. The driver-side parking assist video images thus may be different than the passenger-side parking assist video images (with the different video images derived from different portions of the fields of view of the respective cameras).

After the vehicle is parked, and when started again to exit the parking space, the driver-side video display screen displays the driving assist video images while the passenger-side video display screen displays the parking assist video images. After the vehicle has exited the parking space, the driver-side video monitor continues display of the driving assist video images and the passenger-side video monitor automatically ceases display of the parking assist video images and displays the driving assist video images that are different than the driving assist video images. The system may determine the vehicle has exited the parking space (and thus may switch the passenger-side video monitor to display the driving assist video images) responsive to a threshold event or condition, such as responsive to the vehicle reaching a threshold forward speed (e.g., 5 mph or 10 mph or 15 mph), or the vehicle traveling a threshold forward distance (e.g., 20 ft or 50 ft or 100 ft), or elapsing of a threshold time period (e.g., 5 seconds or 10 seconds or 15 seconds) after the vehicle has exited the parking space.

Rear backup systems with FMVSS 111-required field of view and in-cabin video display performance are now mandatory on all new light vehicles made in or imported into the USA. Today, most new vehicles meet this mandate by using a single video display (with diagonal dimension at least 5 inches) located at or about the center region of the front instrument console. In a CMS-equipped vehicle utilizing a driver-side video monitor (receiving its video feed from a driver-side CMS camera) and a passenger-side video monitor (receiving its video feed from a passenger-side CMS camera), rear backup video images compliant with FMVSS 111 likely will continue to be displayed on a separate centrally-located video screen when rear gear is selected by the driver.

NHTSA in 2008 (see NHTSA DOT HS 811 024, September 2008, which is hereby incorporated herein by reference in its entirety) undertook an On-Road Study of Drivers' Use of Rearview Video Systems. A driver's use of rearview video (RV) systems was observed during staged and naturalistic backing maneuvers to determine whether drivers look at the rearview display during reversing maneuvers and whether use of the system affects the drivers' reversing behavior. The vehicles used were equipped with an interior rearview mirror, a planar driver-side sideview mirror and a convex passenger-side sideview mirror. Overall, results of this study revealed that drivers look at rearview video displays during reversing maneuvers at least some of the time.

Participants' responses regarding where they look primarily to determine whether the area behind the vehicle is clear when reversing showed a fairly equal distribution of reported glances to the side mirrors, center rearview mirror, over their shoulders, and at a rearview video display (when present).

Since 2008, a significant proportion of the American driving population has grown accustomed to reversing using mirrors and a rear backup display. Thus, a further study should be able to establish how the now standard-availability of rear backup systems in vehicles has impacted (and hopefully increased) the amount of time during a backup maneuver that the driver looks at the rear backup display.

In a CMS-equipped vehicle (such as, for example, a 2019 Lexus ES or 2019 Audi e-tron), there may be three video screens for the driver to look at/scan when executing a backup maneuver. This may impact the amount of time during a backup maneuver that a driver looks at a rear backup display and this may impact the efficacy of rear backup systems in terms of making the driver aware of children or other objects present in the blind zone behind the vehicle.

In addition to CMS having driver-side display and a passenger-side display, a center display may be provided. Also, or otherwise, a video display device may be provided in the interior rearview mirror assembly, such as to display video images at the mirror reflective element for viewing by the driver of the vehicle. For example, dual-mode interior rearview mirror assemblies provide a reflected view to the driver of the vehicle (such as is provided by a conventional interior rearview mirror when adjusted to the driver's preferences) and, if selected by the driver, provide a video display view to the driver, whereby a video display screen disposed behind the reflective element operates to display video images derived from image data captured by a rearward viewing camera of the vehicle. Such dual-mode interior rearview mirror assemblies may utilize aspects of the mirror assemblies and systems described in U.S. Pat. Nos. 10,442,360; 10,421,404; 10,166,924; 10,046,706 and/or 10,029,614, and/or U.S. Publication Nos. US-2019-0258131; US-2019-0146297; US-2019-0118717 and/or US-2017-0355312, and/or U.S. provisional application Ser. No. 62/942,305, filed Dec. 2, 2019, which are all hereby incorporated herein by reference in their entireties.

Vehicles equipped with such dual-mode interior mirror assemblies use a rear-mounted and rearward viewing camera that is separate from the rear backup camera required under FMVSS 111. One reason for this is that a dual-mode interior mirror is currently usually an optional feature whereas installation of a rear backup camera is mandated on all vehicles in the USA. Furthermore, rear backup cameras have a field of vision of at least 130 degrees (and many have a field of vision of at least 180 degrees) whereas rear-mounted cameras providing video feed to dual-mode interior mirrors typically have a field of vision of 50 degree or thereabouts. CMOS imagers used for rear backup cameras typically range from VGA resolution to 1.28 megapixel or thereabouts. CMOS imagers providing video feed to dual-mode interior mirrors are 1.6 megapixel resolution. If CMS and the rear backup function share a common rear camera, the imager resolution should be at least 8 megapixels (and more preferably at least 15 megapixels), and the system should use a wide angle lens and sophisticated de-warping and image distortion-reducing video processing.

A dual-mode interior mirror can operate either using a single video feed from a rear camera or using video feeds from a driver-side camera, a rear camera and a passenger-side camera. As shown in FIGS. 7A-C, the interior mirror can display video images from the rearward camera only (FIG. 7A), or video images from the side cameras can be displayed (i) in a manner that distinctly distinguishes/demarcates video images monitoring the side lanes from the main video images provided by the rear camera (FIG. 7B) or (ii) with the video feeds from all three cameras seamlessly stitched together to form a single panoramic video image (FIG. 7C).

Figure 6:
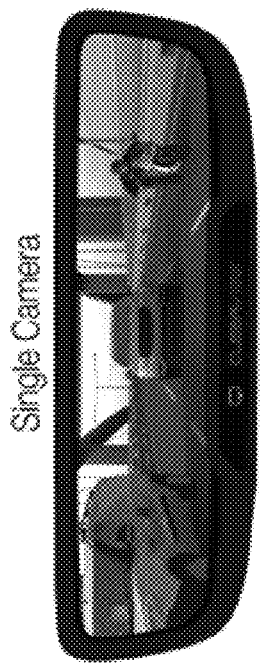
FIG. 6 is a plan view of a vehicle, showing the respective fields of view of a driver-side sideview camera, a rearward viewing camera and a passenger-side sideview camera.
Figure 6:
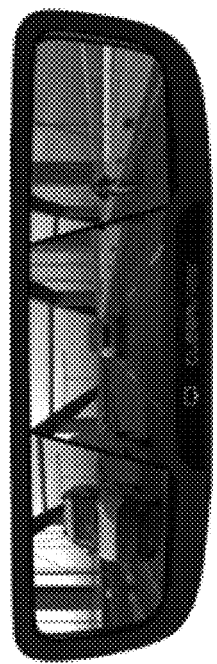
Figure 6:
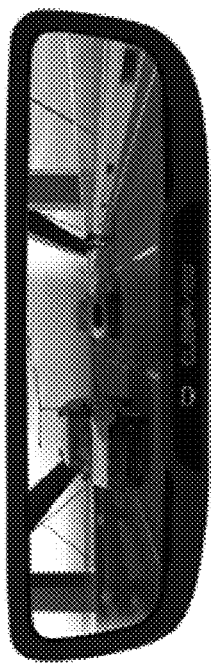
Figure 6:
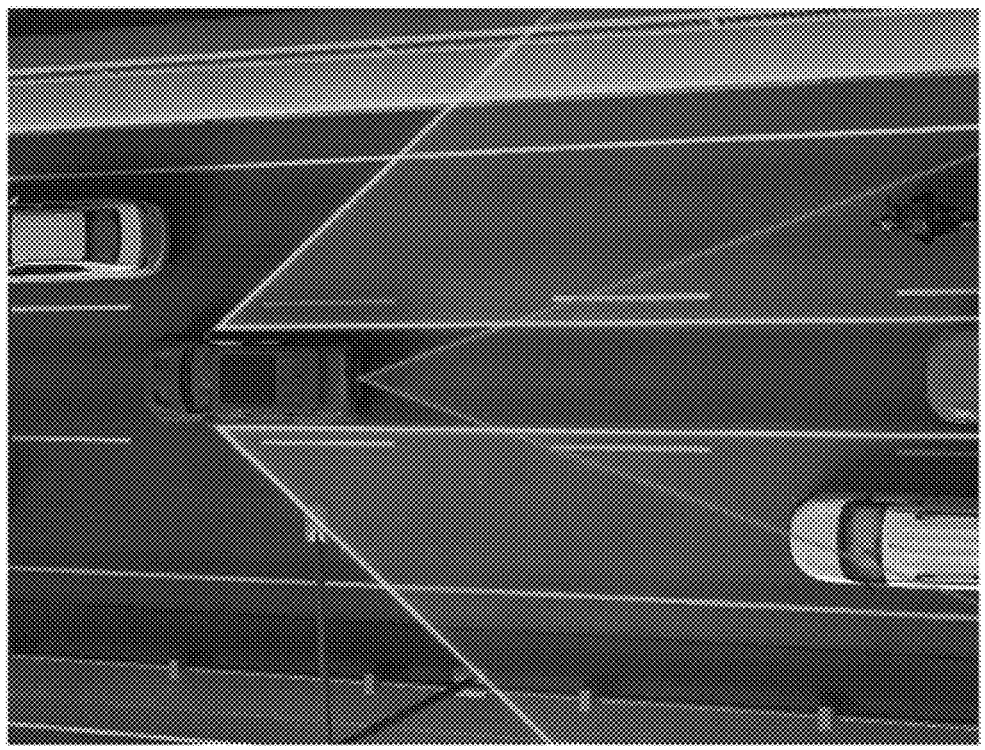

With two side cameras and two respective driver-side and passenger-side interior monitors (with the left or driver-side video monitor that is associated with the driver-side side camera mounted left of the steering column and preferably at or where an exterior rearview mirror is located or would have been located, and with the right passenger-side video monitor that is associated with the passenger-side side camera mounted right of center of the vehicle and optionally at or where an exterior rearview mirror is located or would have been located) and with a dual-mode interior rearview mirror assembly (typically receiving video feed from a rear-mounted camera or potentially receiving video feeds, and such as shown in FIG. 6, from a driver-side sideview camera, a passenger-side sideview camera and the rearward viewing camera), it is important that a driver utilizing such a three video monitor CMS is not overloaded or confused by, for example, seeing a view of traffic approaching or overtaking in the left-side lane displayed both at the driver-side monitor and at the dual-mode interior mirror.

To mitigate or avoid such confusion, the video feeds from all three cameras are provided to an electronic control unit (ECU) that includes an image processor/video processor. Taking as exemplary the driver-side camera video feed and the video feed to the dual-mode interior mirror (with the processing of the passenger-side camera video feed being similar to the processing of the driver-side camera video feed), both such video feeds are processed at the ECU and features commonly viewed or displayed in both the driver-side monitor and the dual-mode interior mirror are identified and tracked. Based at least on such image/video processing, the respective field of view of the driver-side sideview camera as displayed on the driver-side monitor and the field of view of the rear-mounted camera provided to the dual-mode interior mirror are panned, adjusted or cropped so that confusing duplication of video image display seen by the driver using the driver-side monitor and the dual-mode interior mirror is mitigated or reduced. The ECU thus dynamically adjusts or balances what is displayed to be seen on the driver-side monitor and on the dual-mode interior mirror so that duplication is minimized or mitigated while providing to the driver wide angle and readily discernible video images of traffic behind, approaching and/or overtaking the equipped vehicle.

Alternatively, in a vehicle equipped with a driver-side sideview camera and driver-side monitor, a passenger-side sideview camera and passenger-side monitor, and a rearward-viewing camera and dual-mode interior mirror, the field of view of the dual-mode interior mirror narrows or reduces (from, for example, around 50 degrees to around 30 degrees or lower) when either the driver selects a turn signal indicating intent to make a lane change, or when a lane keeping system automatically detects that the vehicle is moving to make a lane change (such a lane keeping system that may utilize aspects of the systems described in U.S. Pat. Nos. 6,882,287; 7,581,859; 9,126,525; 9,180,908; 9,340,227; 9,946,940; 10,268,904 and/or 10,315,651, which are hereby incorporated herein by reference in their entireties). Such dynamic and automatic reduction of the CMS field of view can help mitigate confusion of what is to be seen at the left side or right side monitor. Thus, what is displayed at the dual-mode interior mirror can episodically change based on a prevailing traffic condition. Likewise, and when appropriate, what is shown on the driver-side monitor and/or passenger-side monitor can also and correspondingly episodically change based on the prevailing traffic condition.

Preferably, the CMS continues to be operable after a driver turns off the ignition and prepares to exit the vehicle. Before opening a vehicular door to exit, a driver can and should check in the driver sideview mirror to see if the likes of an approaching cyclist is not in hazard of colliding with the opened door. Plainly, it is desirable that the CMS remains active after the ignition is turned off so that the driver can check what may be approach at the side before opening the door. Lighting and other accessories remain powered and active in many vehicles today for a time period (typically 30 seconds to a five minutes or ten minutes or more) after the ignition is turned off by a driver. Thus, CMS can similarly remain temporarily powered when the driver turns off the ignition.

There are of course scenarios (such as a parent parked to pick up a child at a school or a taxi driver parked waiting to be hailed) where more than a few minutes may pass between turning the ignition off and opening a car door (either for the driver to exit or to allow a passenger to enter). Should it be required to have CMS operational in such circumstances, the CMS can remain powered and operational (even after the driver turns off the ignition) for as long as the driver seat is occupied. Passenger seat occupancy detection is now ubiquitous in modern vehicles to allow the passenger-side airbag to be disabled when the front passenger-side seat is unoccupied. Driver seat occupancy detection can use similar means and technologies.

Thus, for example, the CMS (at least the driver-side camera and the driver-side video display screen) remains operational after ignition shut off and until a period of time following a detection or determination that the driver has left the driver seat (e.g., a period of time following determination, such as by a driver-seat monitoring or occupancy detection system, that the driver seat is unoccupied). The period of time does not start until the driver has left the seat/vehicle, so the CMS (at least the driver-side camera and the driver-side video display screen, but optionally the passenger-side camera and the passenger-side video display screen as well) remains operating while the driver is in the driver seat so that the driver can use the CMS to determine if a pedestrian or bicycle or other vehicle is approaching the subject vehicle at the driver side of the subject vehicle before the driver opens the vehicle door. The driver-seat occupancy determination may only be made (i.e., the driver-seat occupancy detecting system may only operate) responsive to the ignition of the vehicle being turned off when the vehicle is parked.

Driver-seat occupancy can be detected by likes of an in-seat weight sensor, or by a camera-based driver monitoring systems such as the types described in U.S. Pat. No. 9,405,120 and/or U.S. Publication Nos. US-2017-0274906; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, which are hereby incorporated herein by reference in their entireties.

Automobiles today rely on electronics for nearly everything from engine management to chassis control to braking to driver assistance. Automotive electronics and the components used therefor are built to automotive specifications and standards far exceeding those applicable to consumer products.

The IEC 61508 standard (which is hereby incorporated herein by reference in its entirety) applicable to electrical/electronic/programmable safety-related products is replaced in the automotive industry by the ISO 26262 Functional Safety standard (which is hereby incorporated herein by reference in its entirety) that covers the entire product life-cycle of safety-related electrical/electronic systems for road vehicles. There are four Automotive Safety Integrity Levels ("ASILs") identified by ISO 26262: A, B, C, and D. ASILs establish safety requirements based on the probability and acceptability of harm for automotive components, with ASIL-A representing the lowest degree and ASIL-D represents the highest degree of automotive hazard. Systems like airbags, anti-lock brakes and electric power steering are ASIL-D grade because the risks associated with their failure are the highest. Components like rear lights require only an ASIL-A grade. Headlights, brake lights, rear backup camera (if involved in automatic braking), radar cruise control, vision ADAS (if involved in likes of automatic braking) are generally ASIL-B. Cruise control would generally be ASIL-C. Aspects of engine management could warrant ASIL-C (or even ASIL-D). Active suspension could warrant ASIL-C or ASIL-B depending on its particular context and configuration on a vehicle.

Rear backup cameras today rank between QM and ASIL-B (if involved in automatic emergency braking) in accordance with ISO 26262. Quality Management ("QM") means that risk associated with a hazardous event is not unreasonable and does not therefore require safety measures in accordance with ISO 26262. Rear backup cameras enhance safety during reversing maneuvers whereas CMS is relied on by the driver continually during forward driving. Thus, a failure by CMS that impacts safety arguably could have a more immediate potential impact than a failure of a rear backup camera.

Modern cars are built to last, and indeed they do with the average age of vehicles on US roads today being 11.8 years.

Display monitors for CMS use either TFT-LCD (Thin Film Transistor Liquid Crystal Display) screens or OLED (Organic Light Emitting Display) screens. The screens usually are hard-coated to resist scratching and are surface-treated to be anti-glare. To be discernable in bright sunlight, a high screen brightness of at least around 1,000 cd/m² must be attainable throughout the use lifetime of the vehicle. LCD screens use backlighting whereas OLED screens are self-illuminating. At a given level of brightness, LCD screens tend to consume less power than OLED screens. OLED screens surpass LCD screens in color uniformity, color gamut, viewing angle, contrast ratio and black level. OLED screens can be made thinner than LCD screens. By appropriately specifying screen brightness to remain above a minimum brightness even when aged, CMS monitors can be used throughout the lifetime of the vehicle.

Copious means exist to prevent or mitigate lens obstruction from rain, ice, dirt etc. These include using a hydrophobic coating on the camera's outermost lens surface, using a lens heater, using active methods (e.g. vibration, electrostatic repelling, wind curtain, lens wiper) and using a washer spray.

Glare/flare/ghosting caused by strong light sources (sun, headlights) can obscure important objects being imaged from otherwise being seen by a driver viewing the CMS display. Glare/flare can be reduced/eliminated by a properly designed optical system (lens and imager) used by CMS camera. Standards and test procedures like ISO-9358 and ISO-18844 (which are hereby incorporated herein by reference in their entireties) can be used to measure these image aberrations.

Under nighttime driving conditions, such as on a dark country road, electrical noise from a CMS camera as amplified by the control electronics can overshadow display of important objects in the exterior scene. It is thus important to design the camera to have low imager noise. Standards and test procedures like ISO-15739 (which is hereby incorporated herein by reference in its entirety) can be used to measure imager noise.

With regard to image quality of the image presented on a CMS electronic visual display, ISO 16505 (which is hereby incorporated herein by reference in its entirety) provides performance requirements and test procedures to evaluate image quality.

Rearview mirror systems are inherently failsafe. CMS is not inherently failsafe. UNECE R46 at 6.2.2.3.2. (which is hereby incorporated herein by reference in its entirety) states that if the system is not operational (e.g. CMS failure), it shall be indicated to the driver by, for example, warning indication, display information or absence of status indicator, and the operator's manual shall explain the information indicated.

A CMS-equipped vehicle can (i) have two exterior sideview cameras and two associated in-cabin video monitors, and also have an FMVSS 111-compliant interior mirror assembly (this can be a dual-mode interior mirror assembly receiving video feed from a third rear-mounted camera), or (ii) have two exterior sideview cameras and two associated in-cabin video monitors, and also have a rear-mounted third camera and an associated third in-cabin video monitor but with no FMVSS 111-compliant interior mirror assembly present in the vehicle. In either of (i) or (ii), video data captured by CMS cameras can be processed by a central ECU or by multiple ECUs.

There are thus multiple failure modes possible with CMS, including:
  i. Failure of one but not all of the CMS cameras (for example, should a driver-side sideview camera be damaged/broken but the rest of the system still functions);
  ii. Failure of one but not all of the CMS monitors (for example, should a passenger-side monitor be damaged/broken but the driver-side camera and monitor still function);
  iii. Assuming multiple ECUs are present, failure of one but not all of the CMS ECUs (for example, should a driver-side ECU be damaged/broken but the passenger side of the system still functions);
  iv. Should a single central ECU be used for all cameras in the CMS, failure of that central ECU.

A driver's ability to drive safely with a faulty CMS would be impaired by a failure mode effecting either or both of the sideview cameras/monitors, and this would be exacerbated by absence of an FMVSS 111-compliant interior mirror assembly. For example, failure mode (iv) above could leave the driver wholly dependent on an interior rearview mirror (if present) whereas failure modes (i) to (iii) would still allow the driver to drive with partial CMS utility (for example, if the failure is on the passenger side, the driver can still use the driver-side CMS and can use an interior rearview mirror assembly, if present).

If an FMVSS 111-compliant dual-mode interior mirror assembly is present and assuming the rear-mounted camera and ECU associated therewith remain operational, the driver can choose to use the dual-mode interior mirror to at least partially monitor what traffic may be approaching (for example) on the driver-side should any of a driver-side CMS camera or a driver-side monitor or a driver-side ECU fail.

UNECE R46 at 6.2.2.3.2. does not elaborate on what type or degree of alert or warning the driver should receive in the event of CMS failure, nor does UNECE R46 address subsystem or component redundancy in CMS.

Note that CMS can provide to a driver "clear and reasonably unobstructed view" when all the potential use cases, including corner cases, are covered. Some corner cases include rain drops or dust that obstruct a significant portion of a camera's lens surface, glare/flare caused by a dirty lens surface or poor optical design, lack of camera dynamic range which causes under-exposure at dark areas or saturation in bright areas, causing problems for visibility of objects displayed on a display screen. The above corner cases can be addressed in system requirement and product design.

A driver loses depth perception in CMS. This can be remedied using two identical cameras positioned apart by a certain distance and with the cameras sending images separately to a stereographic display screen. The images from a driver-side left CMS camera are projected to driver's left eye only while the images from a passenger-side right camera are projected to the driver's right eye only. This mimics a human eye's stereoscopic depth perception. Such a system may utilize aspects of the systems described in U.S. provisional application Ser. No. 62/942,305, filed Dec. 2, 2019, which is hereby incorporated herein by reference in its entirety.

Also, an in-cabin camera that views the driver's head can be used to detect driver head position change. Then the CMS image being displayed on an in-cabin CMS display can be adjusted or panned accordingly to mimic what the driver would see looking at different angles at an exterior side view mirror.

Also, when a dual-mode interior video mirror assembly (receiving its video feed from a rear viewing camera) is used with a left-side/driver-side CMS camera/monitor and right-side/passenger-side CMS camera/monitor configuration, the video feeds from the three cameras can be provided to a central electronics control unit (ECU) and be processed thereat so that (taking the left side/driver side as an example) left-side/driver-side video image data captured by the rear-viewing camera to be displayed at the left side of the video display screen of the dual-mode interior mirror assembly and left side lane/driver-side video image data captured by the driver-side CMS camera to be displayed at the left side/driver-side CMS in-cabin video monitor are modified via data processing at a data processor of the ECU so that a driver viewing both the video display screen of the dual-mode interior mirror assembly and the left-side/driver-side CMS monitor is not confused seeing an overtaking vehicle on both screens. Such data processing can include reduction/elimination of redundant or duplicitous image information. Such data processing can include scaling of images so that scale of what the driver sees viewing the video screen of the dual-mode interior video mirror is in-scale with what the driver sees viewing the video screen of the in-cabin CMS monitor.

Optionally, display of video images at the video screen of the dual-mode interior video mirror of vehicle approach in a side lane is episodic and occurs only when a lane change maneuver of the equipped vehicle is anticipated (such as by the driver activating a turn signal indicator or such as by a camera vision-based lane departure warning system of the equipped vehicle detecting a lane change maneuver). In this regard, use can be made of the systems described in U.S. Pat. No. 10,300,856, which is hereby incorporated herein by reference in its entirety.

Also, when a dual-mode interior mirror assembly (receiving its video feed from a rear viewing camera) is used with a left-side/driver-side CMS camera/monitor and right-side/passenger-side CMS camera/monitor configuration, the video feeds from the three cameras can be provided to a central electronics control unit (ECU) and be processed thereat, and left-side/driver-side video image data captured by the rear-viewing camera is displayed at the left side/driver side of the video display screen of the dual-mode interior mirror assembly or right-side/passenger-side video image data captured by the rear-viewing camera is displayed at the right side/passenger of the video display screen of the dual-mode interior mirror assembly only when no approaching or overtaking other vehicle is detected by a vehicle detection system of the equipped vehicle to be present in the respective driver-side or passenger-side side lane.

The camera or cameras may comprise any suitable imaging sensor or camera, such as a pixelated imaging array or the like, such as a CMOS imaging array sensor, a CCD sensor or other sensors or the like, such as a camera or sensor of the types disclosed in commonly assigned, U.S. Pat. Nos. 7,965,336; 5,550,677; 5,760,962; 6,097,023 and 5,796,094, which are hereby incorporated herein by reference in their entireties. Optionally, the camera may comprise a stereo imaging camera or the like, such as by utilizing aspects of the imaging systems described in U.S. Pat. Nos. 6,396,397 and/or 5,796,094, which are hereby incorporated herein by reference in their entireties. Optionally, the camera may comprise an infrared or near infrared light sensitive camera and may be suitable for capturing images in low lighting conditions, and/or the camera may include or be associated with an illumination source (such as an infrared or near-infrared light emitting illumination source that, when actuated to emit infrared or near-infrared light at the side of the vehicle, enhances the camera's performance but is not visible or discernible to the driver of the vehicle), such as by utilizing aspects of the cameras described in U.S. Pat. Nos. 7,965,336; 5,550,677; 5,760,962; 6,097,023 and 5,796,094, which are hereby incorporated herein by reference in their entireties.

The sideward and rearward viewing camera may be incorporated at the exterior rearview mirror assembly or elsewhere at the vehicle, such as at a side portion of the vehicle, and having a sideward and rearward field of view. Optionally, the camera may have a wide angle field of view at the side of the vehicle and/or may have an adjustable field of view and/or may capture images for use in other vision systems, such as for use in a top-down view or bird's-eye view vision system of the vehicle or a surround view vision system at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Optionally, the display may be mounted elsewhere in the vehicle and/or at the vehicle door or vehicle door opening, such as at the A-pillar of the vehicle, or at the top of the instrument panel of the vehicle, or at the steering column of the vehicle, or at or in the headliner of the vehicle and/or the like. Optionally, as an alternative to a self-contained display monitor, the mirror and camera and display system of the present invention may provide a docking station (such as at or near the vehicle door and/or door opening of the vehicle) for a cell phone (or tablet or other personal portable display capable device), where the cell phone or personal display device may be docked or connected so that the display screen of the personal display device may function as the display and may display the images captured by the camera.

The display screen preferably displays the captured video images at the entire viewable portion of the display screen, in order to provide relatively large displayed images for viewing by the driver of the vehicle while the driver is normally operating the vehicle. In the illustrated embodiment, the user inputs are touch or proximity sensors disposed at a portion of the display screen. The video display screen, when normally operating to display video images captured by the camera, may display the video images over the entire display portion or active portion of the display screen and, responsive to a user input (such as a user or driver touching a portion of the display screen or touch screen), may display icons or indicia at a portion of the display screen to indicate where the user can touch to actuate or control the display settings or the like. The user inputs or touch sensors may comprise any suitable sensors or inputs, and may utilize aspects of the inputs and sensors described in U.S. Pat. Nos. 7,224,324; 7,253,723; 7,255,451 and/or 8,154,418, and/or International Publication Nos. WO 2012/051500; WO 2010/124064; WO 2011/044312; WO 2013/071070 and/or WO 2013/126719, which are hereby incorporated herein by reference in their entireties.

Optionally, the display may utilize aspects of the displays of the types disclosed in U.S. Pat. Nos. 9,264,672; 9,041,806; 7,855,755; 7,777,611; 7,626,749; 7,581,859; 7,446,924; 7,446,650; 7,370,983; 7,338,177; 7,274,501; 7,255,451; 7,195,381; 7,184,190; 6,690,268; 6,329,925; 5,668,663; 5,530,240 and/or 5,724,187, and/or in U.S. Publication No. US-2006-0050018, and/or International Publication No. WO 2004/058540, which are all hereby incorporated herein by reference in their entireties. The display may be viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like.

Changes and modifications to the specifically described embodiments may be carried out without departing from the principles of the present invention, which is intended to be limited only by the scope of the appended claims as interpreted according to the principles of patent law.

The invention claimed is:

1. A vehicular camera monitoring system, the vehicular camera monitoring system comprising:
   a rearward-viewing camera disposed at a rear portion of a vehicle equipped with the vehicular camera monitoring system, the rearward-viewing camera viewing at least rearward of the vehicle;
   wherein the rearward-viewing camera comprises a CMOS imager having at least 1.28 megapixels;
   wherein the rearward-viewing camera is operable to capture image data;

a driver-side camera disposed at a driver side of the vehicle, the driver-side camera viewing at least sideward and rearward of the driver side of the vehicle, wherein the driver-side camera views at least a portion of a driver-side traffic lane adjacent to a traffic lane in which the vehicle is traveling along a road;

wherein the driver-side camera comprises a CMOS imager having at least 1.28 megapixels;

wherein the driver-side camera is operable to capture image data;

a passenger-side camera disposed at a passenger side of the vehicle, the passenger-side camera viewing at least sideward and rearward of the passenger side of the vehicle, wherein the passenger-side camera views at least a portion of a passenger-side traffic lane adjacent to the traffic lane in which the vehicle is traveling;

wherein the passenger-side camera comprises a CMOS imager having at least 1.28 megapixels;

wherein the passenger-side camera is operable to capture image data;

a dual-mode interior rearview mirror assembly disposed at an interior cabin of the vehicle, wherein the dual-mode interior rearview mirror assembly includes a mirror reflective element and a video display screen disposed behind the mirror reflective element and operable to display video images for viewing through the mirror reflective element by a driver of the vehicle;

wherein the dual-mode interior rearview mirror assembly is operable in (i) a mirror mode, where the mirror reflective element of the dual-mode interior rearview mirror assembly reflects a rearward view to the driver of the vehicle, and (ii) a display mode, where the video display screen operates to display video images for viewing through the mirror reflective element by the driver of the vehicle;

wherein, with the vehicle traveling along the road, and with the dual-mode interior rearview mirror assembly operating in the display mode, the video display screen displays one selected from the group consisting of (i) rearview video images derived at least in part from image data captured by the rearward-viewing camera, (ii) rearview video images derived at least in part from image data captured by the rearward-viewing camera and driver-side video images derived at least in part from image data captured by the driver-side camera, (iii) rearview video images derived at least in part from image data captured by the rearward-viewing camera and passenger-side video images derived at least in part from image data captured by the passenger-side camera and (iv) rearview video images derived at least in part from image data captured by the rearward-viewing camera and driver-side video images derived at least in part from image data captured by the driver-side camera and passenger-side video images derived at least in part from image data captured by the passenger-side camera;

wherein the video display screen displays at least passenger-side video images of a passenger-side region sideward and rearward of the passenger side of the vehicle until a period of time elapses following a passenger exiting the vehicle from a passenger seat of the vehicle;

wherein, during a parallel parking maneuver of the vehicle, (i) the video display screen displays driver-side video images of a driver-side region sideward and rearward of the driver side of the vehicle and (ii) the video display screen displays passenger-side video images that provide to the driver of the vehicle viewing the video display screen a view of a passenger-side ground region at the passenger side of the vehicle;

wherein, after the vehicle is parallel parked in a parallel parking space at the passenger side of the road, and responsive to the driver executing a parallel parking space exit maneuver of the vehicle out of the parallel parking space onto the road, the video display screen displays driver-side video images and displays the passenger-side video images that provide to the driver of the vehicle viewing the video display screen the view of the passenger-side ground region at the passenger side of the vehicle;

wherein, upon completion of the parallel parking space exit maneuver, the video display screen displays passenger-side video images of the passenger-side region sideward of the passenger side of the vehicle and rearward of the vehicle; and wherein the video display screen commences display of the passenger-side region sideward of the passenger side of the vehicle and rearward of the vehicle responsive to a threshold condition being met following completion of the parallel parking space exit maneuver, and wherein the threshold condition comprises at least one selected from the group consisting of (i) the vehicle reaching a threshold speed after exiting the parallel parking space, (ii) the vehicle traveling a threshold distance after exiting the parallel parking space and (iii) a threshold period of time elapsing after the vehicle has exited the parallel parking space.

2. The vehicular camera monitoring system of claim 1, wherein the video display screen is operable to display a graphic overlay at the displayed driver-side video images to alert the driver of relative locations of other vehicles viewed by the driver-side camera.

3. The vehicular camera monitoring system of claim 1, wherein the video display screen is operable to display a graphic overlay at the displayed passenger-side video images to alert the driver of relative locations of other vehicles viewed by the passenger-side camera.

4. The vehicular camera monitoring system of claim 1, wherein the driver-side camera is disposed at a driver-side exterior rearview mirror assembly mounted at an exterior portion of a driver-side door of the vehicle, and wherein the passenger-side camera is disposed at a passenger-side exterior rearview mirror assembly mounted at an exterior portion of a passenger-side door of the vehicle.

5. The vehicular camera monitoring system of claim 1, wherein a passenger-seat occupancy detection system detects exit by the passenger of the vehicle from the passenger seat of the vehicle.

6. The vehicular camera monitoring system of claim 5, wherein the passenger-seat occupancy detection system operates to determine occupancy of the passenger seat responsive to the vehicle being powered down.

7. The vehicular camera monitoring system of claim 5, wherein the passenger-seat occupancy detection system operates to determine occupancy of the passenger seat responsive to the vehicle being stopped.

8. The vehicular camera monitoring system of claim 5, wherein the passenger-side camera and the video display screen of the vehicular camera monitoring system remain operating until the period of time elapses following determination that the passenger seat is unoccupied.

9. The vehicular camera monitoring system of claim 1, wherein, responsive to the vehicle stopping, the video display screen displays at least driver-side video images of the driver-side region sideward and rearward of the driver side of the vehicle and continues to display the at least driver-side video images until a period of time elapses following the driver exiting the vehicle from a driver seat of the vehicle.

10. The vehicular camera monitoring system of claim 1, wherein, responsive to the vehicle stopping, the video display screen displays the at least passenger-side video images and continues to display the at least passenger-side video images until the period of time elapses following the passenger exiting the vehicle from the passenger seat of the vehicle.

11. The vehicular camera monitoring system of claim 1, wherein the passenger-side video images displayed by the video display screen during the parallel parking maneuver of the vehicle comprise passenger-side video images of the ground adjacent to and forward and/or rearward of the vehicle to assist the driver in maneuvering the vehicle into the parallel parking space.

12. The vehicular camera monitoring system of claim 1, wherein video image data captured by the rearward-viewing camera, the driver-side camera and the passenger-side camera are provided to an electronic control unit (ECU) that includes an image processor for processing the captured video image data.

13. The vehicular camera monitoring system of claim 12, wherein processing at the ECU of the captured video image data includes cropping video image data to mitigate duplication of video images displayed at the video display screen.

14. The vehicular camera monitoring system of claim 1, wherein the dual-mode interior rearview mirror assembly automatically operates in the display mode responsive to a driving condition of the vehicle.

15. The vehicular camera monitoring system of claim 1, wherein the rearward-viewing camera comprises a CMOS imager having at least 8 megapixels.

16. The vehicular camera monitoring system of claim 1, wherein the CMOS imager of the driver-side camera has at least 8 megapixels, and wherein the CMOS imager of the passenger-side camera has at least 8 megapixels.

17. A vehicular camera monitoring system, the vehicular camera monitoring system comprising:
a rearward-viewing camera disposed at a rear portion of a vehicle equipped with the vehicular camera monitoring system, the rearward-viewing camera viewing at least rearward of the vehicle;
wherein the rearward-viewing camera comprises a CMOS imager having at least 1.28 megapixels;
wherein the rearward-viewing camera is operable to capture image data;
a driver-side camera disposed at a driver-side exterior rearview mirror assembly mounted at an exterior portion of a driver side of the vehicle, the driver-side camera viewing at least sideward and rearward of the driver side of the vehicle, wherein the driver-side camera views at least a portion of a driver-side traffic lane adjacent to a traffic lane in which the vehicle is traveling along a road;
wherein the driver-side camera comprises a CMOS imager having at least 1.28 megapixels;
wherein the driver-side camera is operable to capture image data;
a passenger-side camera disposed at a passenger-side exterior rearview mirror assembly mounted at an exterior portion of a passenger side of the vehicle, the passenger-side camera viewing at least sideward and rearward of the passenger side of the vehicle, wherein the passenger-side camera views at least a portion of a passenger-side traffic lane adjacent to the traffic lane in which the vehicle is traveling;
wherein the passenger-side camera comprises a CMOS imager having at least 1.28 megapixels;
wherein the passenger-side camera is operable to capture image data;
a dual-mode interior rearview mirror assembly disposed at an interior cabin of the vehicle, wherein the dual-mode interior rearview mirror assembly includes a mirror reflective element and a video display screen disposed behind the mirror reflective element and operable to display video images for viewing through the mirror reflective element by a driver of the vehicle;
wherein the dual-mode interior rearview mirror assembly is operable in (i) a mirror mode, where the mirror reflective element of the dual-mode interior rearview mirror assembly reflects a rearward view to the driver of the vehicle, and (ii) a display mode, where the video display screen operates to display video images for viewing through the mirror reflective element by the driver of the vehicle;
wherein, with the vehicle traveling along the road, and with the dual-mode interior rearview mirror assembly operating in the display mode, the video display screen displays one selected from the group consisting of (i) rearview video images derived at least in part from image data captured by the rearward-viewing camera, (ii) rearview video images derived at least in part from image data captured by the rearward-viewing camera and driver-side video images derived at least in part from image data captured by the driver-side camera, (iii) rearview video images derived at least in part from image data captured by the rearward-viewing camera and passenger-side video images derived at least in part from image data captured by the passenger-side camera and (iv) rearview video images derived at least in part from image data captured by the rearward-viewing camera and driver-side video images derived at least in part from image data captured by the driver-side camera and passenger-side video images derived at least in part from image data captured by the passenger-side camera;
wherein, responsive to the vehicle stopping, the video display screen displays at least driver-side video images of a driver-side region sideward and rearward of the driver side of the vehicle and continues to display the at least driver-side video images until a period of time elapses following the driver exiting the vehicle from a driver seat of the vehicle;
wherein, responsive to the vehicle stopping and when a passenger is seated at a passenger seat at the passenger side of the vehicle, the video display screen displays at least passenger-side video images of a passenger-side region sideward and rearward of the passenger side of the vehicle and continues to display the at least passenger-side video images until a period of time elapses following the passenger exiting the vehicle from the passenger seat of the vehicle;
wherein, responsive to the driver executing a parking space exit maneuver of the vehicle out of a parking space onto the road, with the dual-mode interior rearview mirror assembly operating in the display mode, the video display screen (i) displays driver-side video images and (ii) displays the passenger-side video images that provide to the driver of the vehicle viewing the video display screen the view of the passenger-side region at the passenger side of the vehicle;

wherein, upon completion of the parking space exit maneuver, and with the dual-mode interior rearview mirror assembly operating in the display mode, the video display screen displays passenger-side video images of the passenger-side region sideward and rearward of the passenger side of the vehicle; and wherein the video display screen commences display of the passenger-side region sideward and rearward of the passenger side of the vehicle responsive to a threshold condition being met following completion of the parking space exit maneuver, and wherein the threshold condition comprises at least one selected from the group consisting of (i) the vehicle reaching a threshold speed after exiting the parking space, (ii) the vehicle traveling a threshold distance after exiting the parking space and (iii) a threshold period of time elapsing after the vehicle has exited the parking space.

18. The vehicular camera monitoring system of claim 17, wherein the video display screen is operable to display a graphic overlay at the displayed driver-side video images to alert the driver of relative locations of other vehicles viewed by the driver-side camera, and wherein the video display screen is operable to display a graphic overlay at the displayed passenger-side video images to alert the driver of relative locations of other vehicles viewed by the passenger-side camera.

19. The vehicular camera monitoring system of claim 17, wherein a passenger-seat occupancy detection system detects exit by the passenger of the vehicle from the passenger seat of the vehicle.

20. The vehicular camera monitoring system of claim 17, wherein, during a parking maneuver of the vehicle, the video display screen displays passenger-side video images that provide to the driver of the vehicle viewing the video display screen a view of a passenger-side ground region at the passenger side of the vehicle.

21. The vehicular camera monitoring system of claim 17, wherein video image data captured by the rearward-viewing camera, the driver-side camera and the passenger-side camera are provided to an electronic control unit (ECU) that includes an image processor for processing the captured video image data.

22. The vehicular camera monitoring system of claim 21, wherein processing at the ECU of the captured video image data includes cropping video image data to mitigate duplication of video images displayed at the video display screen.

23. The vehicular camera monitoring system of claim 17, wherein the dual-mode interior rearview mirror assembly automatically operates in the display mode responsive to a driving condition of the vehicle.

24. A vehicular camera monitoring system, the vehicular camera monitoring system comprising:
a rearward-viewing camera disposed at a rear portion of a vehicle equipped with the vehicular camera monitoring system, the rearward-viewing camera viewing at least rearward of the vehicle;
wherein the rearward-viewing camera comprises a CMOS imager having at least 1.28 megapixels;
wherein the rearward-viewing camera is operable to capture image data;
a driver-side camera disposed at a driver side of the vehicle, the driver-side camera viewing at least sideward and rearward of the driver side of the vehicle, wherein the driver-side camera views at least a portion of a driver-side traffic lane adjacent to a traffic lane in which the vehicle is traveling along a road;
wherein the driver-side camera comprises a CMOS imager having at least 1.28 megapixels;
wherein the driver-side camera is operable to capture image data;
a passenger-side camera disposed at a passenger side of the vehicle, the passenger-side camera viewing at least sideward and rearward of the passenger side of the vehicle, wherein the passenger-side camera views at least a portion of a passenger-side traffic lane adjacent to the traffic lane in which the vehicle is traveling;
wherein the passenger-side camera comprises a CMOS imager having at least 1.28 megapixels;
wherein the passenger-side camera is operable to capture image data;
wherein video image data captured by the rearward-viewing camera, the driver-side camera and the passenger-side camera are provided to an electronic control unit (ECU) that includes an image processor for processing the captured video image data;
a dual-mode interior rearview mirror assembly disposed at an interior cabin of the vehicle, wherein the dual-mode interior rearview mirror assembly includes a mirror reflective element and a video display screen disposed behind the mirror reflective element and operable to display video images for viewing through the mirror reflective element by a driver of the vehicle;
wherein the dual-mode interior rearview mirror assembly is operable in (i) a mirror mode, where the mirror reflective element of the dual-mode interior rearview mirror assembly reflects a rearward view to the driver of the vehicle, and (ii) a display mode, where the video display screen operates to display video images for viewing through the mirror reflective element by the driver of the vehicle;
wherein, with the vehicle traveling along the road, and with the dual-mode interior rearview mirror assembly operating in the display mode, the video display screen displays one selected from the group consisting of (i) rearview video images derived at least in part from image data captured by the rearward-viewing camera, (ii) rearview video images derived at least in part from image data captured by the rearward-viewing camera and driver-side video images derived at least in part from image data captured by the driver-side camera, (iii) rearview video images derived at least in part from image data captured by the rearward-viewing camera and passenger-side video images derived at least in part from image data captured by the passenger-side camera and (iv) rearview video images derived at least in part from image data captured by the rearward-viewing camera and driver-side video images derived at least in part from image data captured by the driver-side camera and passenger-side video images derived at least in part from image data captured by the passenger-side camera;
wherein, responsive to one selected from the group consisting of (i) the vehicle stopping and (ii) the vehicle being powered down, and with a passenger seated at a passenger seat of the vehicle, the video display screen displays at least passenger-side video images of a passenger-side region sideward and rearward of the passenger side of the vehicle and continues to display the at least passenger-side video images until a period of time elapses following the passenger exiting the vehicle from the passenger seat of the vehicle;

wherein a passenger-seat occupancy detection system detects exit by the passenger of the vehicle from the passenger seat of the vehicle;

wherein, responsive to the driver executing a parking space exit maneuver of the vehicle out of a parking space onto the road, and with the dual-mode interior rearview mirror assembly operating in the display mode, the video display screen (i) displays driver-side video images and (ii) displays the passenger-side video images that provide to the driver of the vehicle viewing the video display screen the view of the passenger-side region at the passenger side of the vehicle;

wherein, upon completion of the parking space exit maneuver, and with the dual-mode interior rearview mirror assembly operating in the display mode, the video display screen displays passenger-side video images of the passenger-side region sideward and rearward of the passenger side of the vehicle; and wherein the video display screen commences display of the passenger-side region sideward and rearward of the passenger side of the vehicle responsive to a threshold condition being met following completion of the parking space exit maneuver, and wherein the threshold condition comprises at least one selected from the group consisting of (i) the vehicle reaching a threshold speed after exiting the parking space, (ii) the vehicle traveling a threshold distance after exiting the parking space and (iii) a threshold period of time elapsing after the vehicle has exited the parking space.

25. The vehicular camera monitoring system of claim 24, wherein the video display screen is operable to display a graphic overlay at the displayed driver-side video images to alert the driver of relative locations of other vehicles viewed by the driver-side camera, and wherein the video display screen is operable to display a graphic overlay at the displayed passenger-side video images to alert the driver of relative locations of other vehicles viewed by the passenger-side camera.

26. The vehicular camera monitoring system of claim 24, wherein the driver-side camera is disposed at a driver-side exterior rearview mirror assembly mounted at an exterior portion of a driver-side door of the vehicle, and wherein the passenger-side camera is disposed at a passenger-side exterior rearview mirror assembly mounted at an exterior portion of a passenger-side door of the vehicle.

27. The vehicular camera monitoring system of claim 24, wherein the passenger-seat occupancy detection system operates to determine occupancy of the passenger seat responsive to the vehicle being powered down.

28. The vehicular camera monitoring system of claim 24, wherein the passenger-seat occupancy detection system operates to determine occupancy of the passenger seat responsive to the vehicle being stopped.

29. The vehicular camera monitoring system of claim 24, wherein, during a parking maneuver of the vehicle, the video display screen displays passenger-side video images that provide to the driver of the vehicle viewing the video display screen a view of a passenger-side ground region at the passenger side of the vehicle.

30. The vehicular camera monitoring system of claim 24, wherein processing at the ECU of the captured video image data includes cropping video image data to mitigate duplication of video images displayed at the video display screen.

31. The vehicular camera monitoring system of claim 24, wherein the dual-mode interior rearview mirror assembly automatically operates in the display mode responsive to a driving condition of the vehicle.

* * * * *